June 29, 1948.  E. R. FITCH  2,444,190
FLUID PRESSURE CONTROL MECHANISM
Filed Oct. 31, 1944  3 Sheets-Sheet 1

Fig.1.

INVENTOR.
*Ellery R. Fitch.*
BY
*Scrivener + Parker*
ATTORNEYS

June 29, 1948. E. R. FITCH 2,444,190
FLUID PRESSURE CONTROL MECHANISM
Filed Oct. 31, 1944 3 Sheets-Sheet 2

INVENTOR.
*Ellery R. Fitch.*
BY
*Scrivener & Parker*
ATTORNEYS

June 29, 1948.  E. R. FITCH  2,444,190
FLUID PRESSURE CONTROL MECHANISM
Filed Oct. 31, 1944  3 Sheets-Sheet 3

INVENTOR.
Ellery R. Fitch.
BY
Scrivener + Parker
ATTORNEYS

Patented June 29, 1948

2,444,190

UNITED STATES PATENT OFFICE 2,444,190

FLUID PRESSURE CONTROL MECHANISM

Ellery R. Fitch, Elyria, Ohio, assignor to Bendix-Westinghouse Automotive Air Brake Company, Elyria, Ohio, a corporation of Delaware Application October 31, 1944, Serial No. 561,256

10 Claims. (Cl. 303—15)

1

This invention relates to fluid pressure control mechanism, and more particularly to fluid pressure control mechanism of the electropneumatic type for controlling the operation of vehicle brakes.

It has previously been proposed to employ electromagnet valve mechanisms for assisting in the control of the brakes on vehicles in order to obtain a more satisfactory and efficient remote control and a more rapid application and release of the brakes, but many of these systems have had a disadvantage from the standpoint of safety and efficient operation, and it is accordingly an object of the present invention to provide electropneumatic fluid pressure control mechanism of the above type, so constituted as to overcome these difficulties.

Another object of the invention is to provide, in a fluid pressure control mechanism of the above type, means for insuring positive and coordinated control of the energization and deenergization of the electromagnetic control valves under the control of the vehicle operator.

A further object of the invention is to provide, in a system of the above type, means controlled in accordance with the operation of the brake valve for controlling the energization and deenergization of the electromagnet valves, so constituted as to permit a direct control by the operator's brake valve of the supply and release of fluid pressure to and from the brake actuators in the event of failure of the electrical portion of the system.

Still another object of the invention is to provide, in a system of the above type, a controller for controlling the energization and de-energization of the electromagnet application and release valves, so constituted as to be capable of ready attachment to existing fluid pressure control systems of conventional type, without appreciably changing the characteristics of such systems and without requiring the use of separate types of fluid pressure control valves in the conventional portion of the system.

Another object of the invention is to provide fluid pressure operated means for positively controlling and actuating the operation of switches of the snap action type in the circuits of the electromagnet valves.

A still further object of the invention is to provide, in a controller for a system of the above type, operating connections between a pressure responsive switch operating member and the switches so constituted as to permit movement of the member after operation of the switches for the purpose of permitting the member to establish direct communication between the operator's control valve and the fluid pressure operated device or actuator.

Yet another object of the invention is to provide, in connection with a system of the electropneumatic type having a fluid pressure operated valve of the relay emergency type adapted to effect an emergency application of the brakes in response to a drop in pressure at the source, means for supplying fluid pressure from the source to the electromagnet valves so constituted as to prevent the operation of the latter valves from interfering with the normal functions of the relay emergency valve.

Other objects and novel features of the invention will appear more fully from the following detailed description when taken in connection with the accompanying drawings, which illustrate one embodiment of the invention. It is to be expressly understood, however, that the drawings are employed for purposes of illustration only, and are not designed as a definition of the limits of the invention, reference being had for this purpose to the appended claims.

In the drawings, wherein similar reference characters refer to similar parts throughout the several views.

Figure 1:
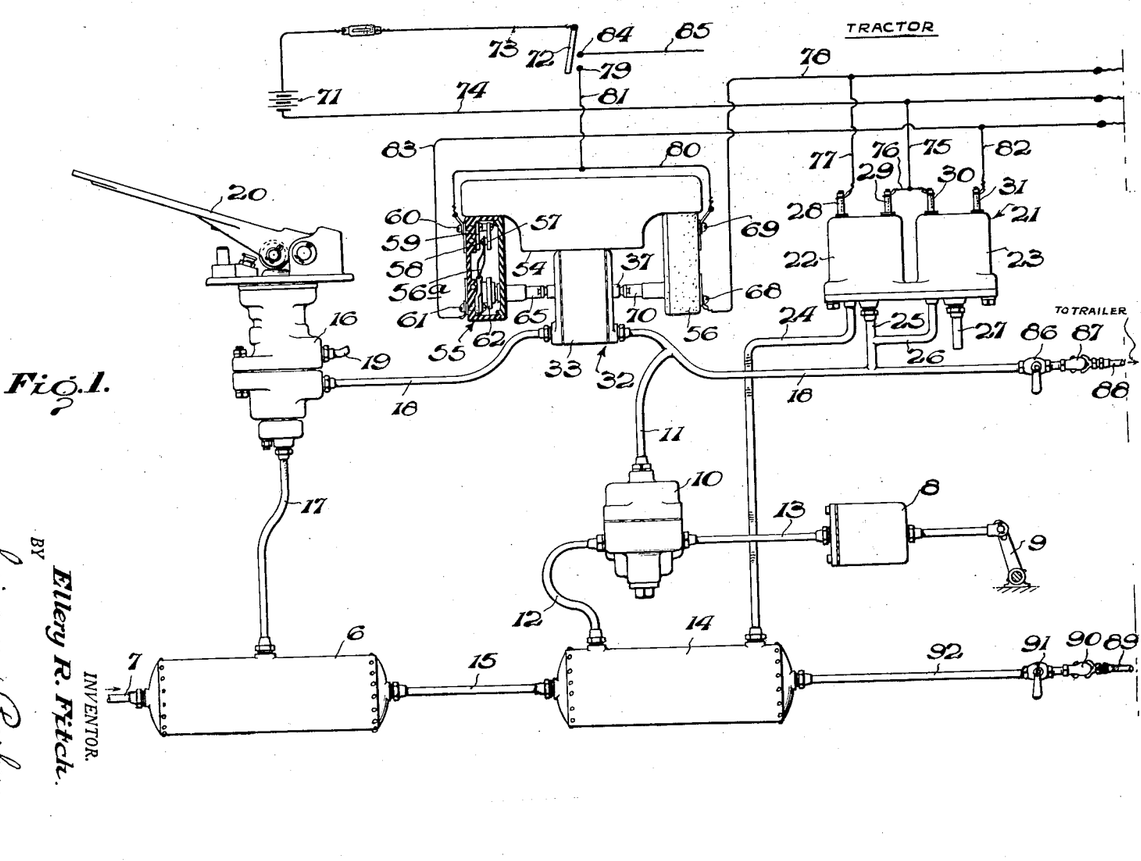
Fig. 1 is a diagrammatic view, partially in section, of an electropneumatic brake system for a tractor constructed in accordance with the principles of the present invention, Fig. 1—a is a diagrammatic view of the coordinated system for use on a trailer drawn by the tractor.

Referring more particularly to Fig. 1 of the drawing, a fluid pressure brake system for a tractor is illustrated as comprising in general a supply reservoir 6 supplied with fluid pressure from a compressor, not shown, through a conduit 7, a brake actuator 8 adapted to operate a brake lever 9 as shown, a fluid pressure operated device or relay valve 10 of conventional type having a control line 11, a supply line 12, an outlet line 13 connected to the actuator as shown, and an exhaust port, not shown, for exhausting fluid pressure from the actuator on corresponding action of the relay valve. The supply line 12 is connected with a second reservoir 14 which is supplied with fluid pressure from the main reservoir 6 by means of a conduit 15. Without showing the construction of the relay valve in detail, it will be understood by those skilled in the art that on application of fluid pressure to the upper end of the relay valve through the control conduit 11, the conduits 12 and 13 will be connected and fluid pressure will be supplied from the reservoir 14 to the actuator 8 at a pressure substantially the same as that existing in the conduit 11, while release of fluid pressure from the conduit 11 results in a corresponding decrease in the pressure supplied to the actuator by the relay valve 10. The system also includes a self-lapping operator's control valve or brake valve 16 of conventional type, which may be constructed in accordance with the principles set forth in the patent to William J. Andres and Roy S. Sanford, No. 2,133,275, dated October 18, 1938. The brake valve 16 is supplied with fluid pressure from the reservoir 6 by means of a conduit 17 and is connected with the conduit 11 by means of a conduit 18, the brake valve further being provided with an exhaust conduit 19 as shown. A brake pedal 20 is provided for operating the brake valve, and it will be understood that with the brake pedal in the position shown, the brake valve is effective to establish communication between conduits 18 and 19 and to prevent communication between conduits 17 and 18. When the brake pedal is depressed, communication between conduits 18 and 19 is interrupted and communication is established between conduits 17 and 18, the mechanism of the valve being such that the pressure supplied to the conduit 18 is substantially proportional to the degree of movement of the pedal 20 from the position shown. Since the conduit 18 is connected with the conduit 11, it will be understood that on operation of the pedal 20 to effect an application of the brakes, fluid pressure will, in the ordinary course of events, be supplied to the conduit 11 and to the upper end of the fluid pressure operated device or relay valve 10, whereupon the latter will be effective to supply fluid pressure from the reservoir 14 to the actuator 8 at a pressure substantially the same as that obtaining in the conduit 11.

The fluid pressure brake system, above described, is of conventional design and is in common use. In view of the fact that in most cases the relay valve 10 is remotely situated from the brake valve 16, considerable delay is often times experienced in supplying fluid pressure from the brake valve to the upper end of the relay valve, and this delay is reflected as a distinct delay in the application of fluid pressure to the actuator 8. In order to overcome this undesirable condition, various means have been proposed in the past for incorporating electrically operated valves of the magnet type in the system in order to provide a more instantaneous supply of fluid pressure to the relay valve or other devices being actuated, and in the present instance a magnet valve 21 is provided of the so-called duplex type, and is adapted to supply fluid pressure directly from the reservoir 14 to the conduit 18 which is connected to the control conduit 11 leading to the upper end of the relay valve 10, this magnet valve being preferably located directly adjacent the relay valve 10 and the reservoir 14. The magnet valve 21 is preferably of the type illustrated in the patent to Wilfred A. Eaton, No. 2,234,897, dated March 11, 1941, the valve comprising an application portion 22 provided with a normally closed inlet valve, not shown, and a release or exhaust portion 23, provided with a normally closed exhaust valve, likewise not shown. The application portion 22 of the valve is supplied with fluid pressure from the reservoir 14 by means of a conduit 24, and is provided with an outlet line 25 connected with the conduit 18, the outlet line also being connected with the exhaust portion 23 of the valve by means of a conduit 26. The exhaust portion of the valve is provided with an exhaust conduit 27, and electromagnets, not shown, of the portions 22 and 23, are provided with terminals 28 and 29 and 30 and 31 respectively. Since, as heretofore stated, both the inlet and exhaust valves are normally in closed position when the magnets are energized, it will be understood that communication is normally prevented between conduits 24 and 25 as well as between conduits 26 and 27. When the portion 22 is energized by proper connections to the terminals 28 and 29, conduits 24 and 25 are connected to supply fluid pressure from the reservoir 14 to the conduit 18 and thence to the upper end of the relay valve 10 through conduit 11. In the event the right portion 23 is energized, a connection is established between conduits 26 and 27, and fluid pressure is exhausted from the top of the relay valve through conduit 11, conduit 18, conduit 25, conduit 26, the magnet valve portion 23 and exhaust conduit 27.

Figure 2:
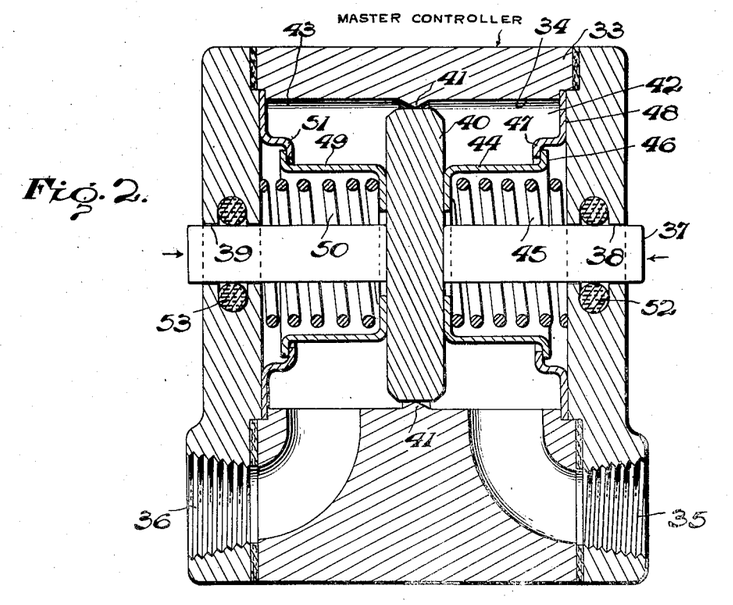
Fig. 2 is a partial sectional view of a controller mechanism for the system shown in Fig. 1.

In order that the magnet valve 21 may be properly controlled in accordance with the operation of the brake valve 16, a controller 32 is provided and interposed in the conduit 18 as will be more fully explained hereinafter. Referring more particularly to Fig. 2 of the drawing, the main portion of this controller includes a casing 33 provided with a cylindrical passage 34 having a port 35 at its right end and a port 36 at the left end, the port 36 being connected to the left hand portion of the conduit 18 shown in Fig. 1 and the port 35 being connected to the right hand portion of the conduit. A rod 37 is slidably mounted in bores 38 and 39 formed in the opposite end of the casing concentric with the passage 34, and a piston 40 is suitably attached to the center of the rod for movement therewith as shown. A preferably V-shaped annular ring 41 is formed on the inner surface of the passage and centrally disposed as shown, and is so dimensioned at its center as to be in substantially sliding engagement with the outer surface of the piston. The piston thus forms, in connection with the passage, a right hand chamber 42 connected with the port 35 and a left hand chamber 43 connected with the port 36, the piston in the position shown serving to prevent communication between the chambers. In order that the piston may be normally maintained in the position shown, a spring cage 44 is provided having its left end maintained in engagement with the right surface of the piston by means of a spring 45 interposed between the left end of the cage and the casing, further movement of the cage to the left being prevented by means of a flange 46 formed thereon and adapted to engage a flange 47 formed on a washer 48 rigidly positioned as shown at the right end of the casing. It will also be noted that the flange portion 46 is so dimensioned as to permit movement of the piston to the right with consequent compression of the spring 45. In like manner, the piston is positioned against movement in the opposite direction by means of a spring cage 49, a spring 50, and a flanged washer 51. Leakage of fluid pressure from the chambers 42 and 43 through the bores 38 and 39 is prevented by means of suitable seals 52 and 53 respectively. Thus it will be apparent that on application of fluid pressure to the chamber 43 through the port 36, the piston 40 will be moved to the right against the force exerted by the spring 45, and after a predetermined degree of movement in this direction, the piston will move to the right of the annular portion 41 sufficiently to permit the flow of fluid pressure from the chamber 43 to the chamber 42 between the piston and the wall of the passage. In the event the pressure in the chamber 42 is greater than the chamber 43, the reverse action will take place, and when the pressures in the two chambers are substantially equalized, the springs 45 and 50 and their associated cages will act to again return the piston to the position shown and to maintain it in this position until a predetermined pressure differential is again established in the two chambers.

Figure 3:
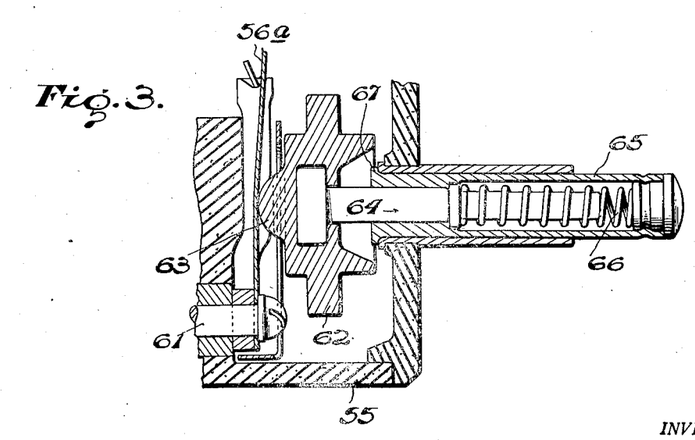
Fig. 3 is a fragmentary sectional view of a switch and the actuating mechanism therefor forming a part of the controller.

Switches are provided for controlling the energization of the magnet valve, and these switches are preferably of the snap action type for the purpose of minimizing arcing and burning of the contacts, and may be constructed in a manner similar to that shown in a patent to Riche, No. 2,181,068. As indicated more particularly in Fig. 1, a controller bracket 54 is suitably attached to the vehicle and also to the casing 33, by means not shown, and switches 55 and 56 are suitably attached to the bracket 54. The switch 55 is shown in partial section, and is preferably of the type disclosed in the above referred to Riche patent. A contact carrying spring member 56a is mounted in the switch 55, as shown in more detail in Fig. 3, the upper end of the spring being normally in engagement with a stop 57 which is insulated from the remainder of the switch. A contact 58 is provided on the upper end of the spring, and is adapted on movement to the left to engage a contact plate 59 suitably connected with a terminal 60, the lower end of the spring being connected with a terminal 61. As shown more fully in Fig. 3, a member 62, of dielectric material, is mounted to engage a portion 63 of the contact spring, the member being provided with an operating plunger 64. Since a resilient or collapsible connection is desired for operating the switch, as will be more fully explained hereinafter, such a connection is provided by means of a hollow plunger 65, slidably mounted in the switch and operatively connected with the plunger 64 by means of a relatively light spring 66 interposed between the plungers 65 and 64, movement of the plunger 65 to the right with relation to the switch being limited by means of a shoulder 67 formed thereon. Thus on movement of the plunger 65 to the left, as shown in Fig. 3, the plunger 64 and the member 62 will move the portion 63 of the contact spring to the left, and as will be well understood by those skilled in the art, the upper end of the contact spring will immediately move with a snap action from the position shown to a position such that the contact 58 is in engagement with the contact plate 59, thus establishing an electrical connection between the terminals 60 and 61 of the switch. The switch 56 of similar construction, is mounted at the right side of the bracket 54, and is provided with terminals 68 and 69 and an operating plunger 70 having a construction similar to that provided on the switch 55. With the parts in the position shown, the contacts of both switches are open, and on movement of the plungers 65 and 70 to the left and right respectively, the switch 55 or the switch 56 will be operated to establish a connection between terminals 60 and 61 or terminals 68 and 69. The switches are mounted in such a manner that with the contacts in open position, the inner ends of the plungers 65 and 70 are substantially in engagement respectively with the left and right ends of the piston rod 37. Thus on initial movement of the piston to the right, the switch 56 is operated to connect terminals 68 and 69, while on movement of the piston to the left from neutral position, the switch 55 is operated to connect terminals 60 and 61. The length of the piston in relation to the formation of the annular portion 41 of the passage 34 is so dimensioned as to permit operation of the switches before sufficient movement occurs to permit communication between chambers 42 and 43 by the piston. In the event a sufficient pressure differential is established across the piston, the springs associated with the plungers 65 and 70 are such as to permit this further movement of the piston after operation of the switches in order to establish such communication.

The vehicle is provided with a suitable battery or source of electricity 71, having one terminal connected with the upper end of a switch bar 72 by means of a wire 73, and the other terminal connected with the terminals 29 and 30 of the magnet valve 21 by means of wires 74, 75 and 76. The terminal 28 of the magnet valve portion 22 is connected with the terminal 68 of the switch 56 by means of wires 77 and 78, the terminal 69 being connected with a switch terminal 79 by means of wires 80 and 81. The switch terminal 79 is so positioned that on movement of the switch bar 72 in a counterclockwise direction, the latter engages the terminal 79 and completes the circuit through the magnet valve portion 22 by means of the connections just described. The terminal 31 of the magnet valve portion 23 is connected with the terminal 61 of the switch 55 by means of wires 82 and 83, the terminal 60 of the switch being connected with the terminal 79 by means of wires 80 and 81. In order that the electromagnet portion of the system may be ineffective when the vehicle is inoperative, an additional switch contact 84 is provided having a wire 85 connected in a conventional manner with the ignition coil, the switch bar thus being operative to energize the ignition circuit and the circuit for the magnet valves at the same time.

As heretofore stated, the brake valve 16 is designed to supply fluid pressure to the conduit 18 at a pressure substantially proportional to the degree of movement of the control pedal 20 from the position shown. Assuming that the pedal is operated to supply a given pressure to the conduit 18, it will be understood that this pressure will be supplied to the chamber 43 of the controller, and that due to the positioning of the piston 40, the chamber 42 will still remain at substantially atmospheric pressure during initial operation of the brake valve. This pressure differential will move the piston to the right, whereupon the plunger 70 will be depressed, and the switch 56 will be operated to connect terminals 68 and 69. When this occurs, the portion 22 of the magnet valve will be energized and communication will be established between conduits 24 and 25, thus supplying fluid pressure from the reservoir 14 directly to the portion of the conduit 18 shown at the right side of the controller 32. Thus pressure will likewise be conveyed to relay valve 10 through the conduit 11, and the relay valve will operate to establish communication between conduits 12 and 13, thus supplying fluid pressure directly from the reservoir 14 to the actuator 8. As the pressure increases in the right hand portion of the conduit 18, the pressure will likewise increase in the chamber 42 of the controller, and when the pressure differential between the chambers becomes insufficient to maintain the piston and piston rod in their right hand operating positions, the spring 45 will move the piston and rod to the left sufficiently to permit the contacts of the switch 55 to move to open position. Thus the de-energization of the portion 22 of the magnet valve prevents the further supply of fluid pressure from the reservoir 14 to the right hand portion of the conduit 18. This action will occur when the pressure in the chamber 42 is substantially the same as that in the chamber 43, and consequently the ultimate pressure reached in the conduit 11 as well as in the actuator 8 will be substantially the same as that supplied to the conduit 18 and to the chamber 43 by the operation of the brake valve 16. Assuming that a predetermined pressure has been established in the conduit and in the actuator in the manner above described, it will be apparent that on release movement of the brake pedal 20, the conduit 18 will be connected with the exhaust conduit 19 in order to exhaust fluid pressure to atmosphere, and the pressure in the left portion of the conduit 18 and in the chamber 43 will be reduced to a new value which is determined by the new setting of the brake pedal 20. When this action occurs, the pressure in the chamber 42 will be in excess of that in the chamber 43, and the piston will be moved to the left to close the contacts of the switch 55 and energize the portion 23 of the magnet valve to establish communication between the right hand portion of the conduit 18 and the exhaust conduit 27 through conduits 25 and 26. The magnet valve portion 23 will continue to exhaust fluid pressure in this manner until the pressures in the chambers 42 and 43 are again substantially equalized, at which time the piston will again be moved to neutral position by the action of the spring 50, and the contacts of the switch 55 will open in order to de-energize the magnet valve portion 23. When this action occurs, the pressures in the conduit 18, chambers 42 and 43, the conduit 11, the conduit 13 and the actuator 8 will again be substantially proportional to the degree of movement of the control pedal 20 from its normal release position, it being understood that during the above release of fluid pressure from the conduit 18 by the operation of the magnet valve, the fluid pressure operated device or relay valve 10 is likewise effective to proportionally release fluid pressure from the actuator 8. Thus a controller has been provided which is responsive to differences in pressure in the two portions of the conduit 18 for controlling the energization of the application and exhaust portions of the magnet valve, in order to maintain a pressure in the right portion of the conduit 18 and in the conduit 11 leading to the relay valve which is substantially proportional at all times to that delivered to the left portion of the conduit 18 by the operation of the brake valve 16, and due to the speed with which the magnet valve is energized and de-energized, and due to the small volume represented by the left portion of the conduit 18 and the controller chamber 43, the speed of application and release of the vehicle brakes is naturally much faster than is the case in a system of the more conventional type.

Due to the possibility of failure of the electrical portion of the system for some reason, such as the breaking of one of the wires, it is also desirable that the brake valve be effective to supply fluid pressure directly to the upper end of the relay valve through the conduit 13 and the conduit 11 in the event of such failure, and as heretofore explained, the switch plungers 65 and 70 are of a collapsible nature, and are so constituted as to permit movement of the piston in either direction after closing of the switch contacts sufficiently to allow the outer surface of the piston to move away from the annular portion 41 of the chambers 43 and 42. The pressure differential at which this action occurs is determined by the tension of the neutralizing springs 45 and 50 and the collapsible springs in the plungers 65 and 70, and the tension of these springs is preferably so chosen as to permit movement of the piston sufficiently to establish communication between chambers 43 and 42 as soon as a relatively small pressure differential, on the order of one or two pounds, for example, is established across the piston. During normal operation of the system, with the electromagnet valve effective, the build-up of pressure in the chamber 42 is so rapid as to prevent sufficient movement of the piston to the right to establish communication between the two chambers of the controller when the brake valve pedal is operated to effect an application of the brakes, and in like manner, the exhaust of fluid pressure from the right portion of the conduit 18 and from the chamber 42 is so rapid on exhaust operation of the magnet valve as to prevent sufficient movement of the piston to the left to allow the exhaust of fluid pressure from the right portion of the conduit 18 and from the conduit 11 through the exhaust port of the brake valve. In the event of failure of the electrical portion of the system, however, the operator has only to operate the brake pedal in the usual manner, whereupon the pressure supplied to the chamber 43 of the controller immediately moves the piston to the right sufficiently to establish relatively unrestricted communication between the chambers 42 and 43. Thus the brakes will be applied by the operator in the usual manner, the only difference being that the operation is somewhat slower than is the case when the electrical portion of the system is operative, and that the pressure supplied to the right portion of the conduit 18 and to the conduit 11 is slightly less than that supplied to the left portion of the conduit 18 due to the differential in pressure set up by the piston 40 and the springs which oppose its movement to the right. During release operation of the brake valve the piston likewise is moved to the left by virtue of the greater pressure in the chamber 42, and communication is established between chambers 42 and 43 in order to permit the exhaust of fluid pressure from the right portion of the conduit 18 and from the conduit 11 through the brake valve.

Figure 1A:
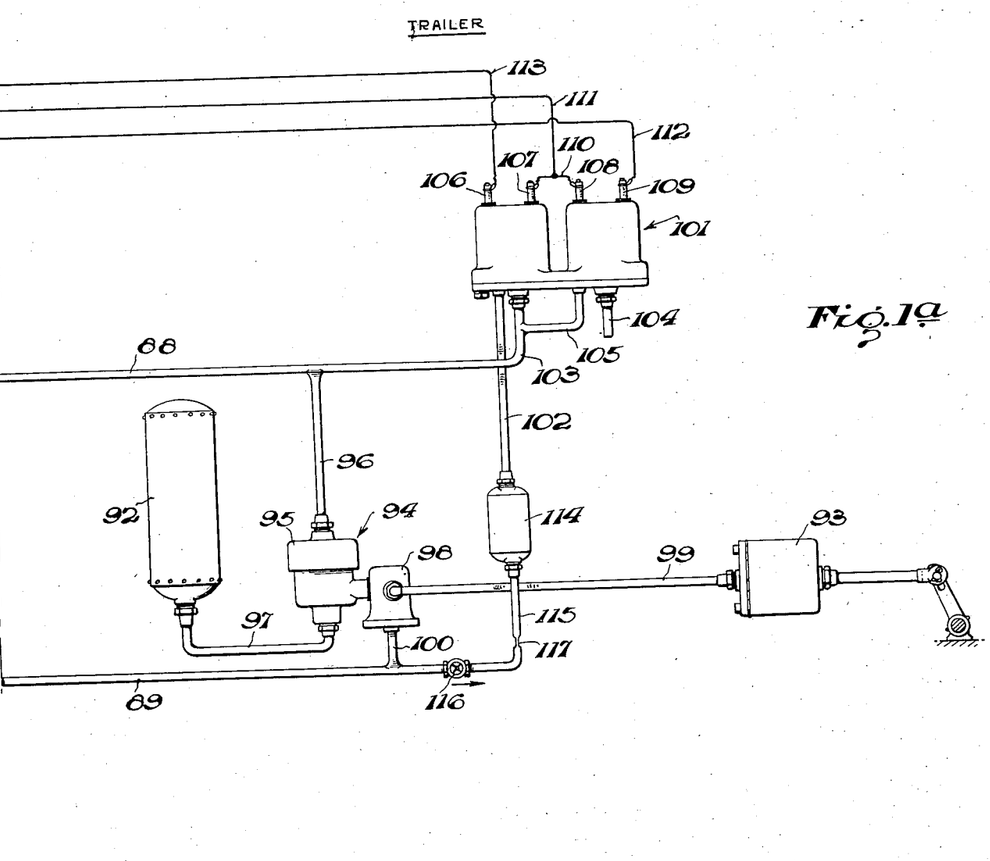

Systems of the above type are particularly advantageous in connection with trailer-tractor trains in view of the relatively long lengths of the fluid pressure supply and control conduits, and the system may be readily applied to a trailer in the manner shown more particularly in Fig. 1—a. The right end of the conduit 18 in Fig. 1 is provided with a shut-off valve 86 and a detachable coupling 87, the latter being connected to a control conduit 88 carried by the trailer. A supply conduit or feed line 89 is also mounted on the trailer and connected with the tractor reservoir 14 through a detachable coupling 90, a shut-off valve 91, and a conduit 92. The valves 86 and 91 are normally closed when the tractor only is in operation, and when the trailer is attached to the tractor, the valves are opened in order to permit the flow of fluid pressure to the conduits 88 and 89 respectively. The trailer is likewise equipped with a fluid pressure brake system of conventional type comprising a trailer reservoir 92, a fluid pressure operated brake actuator 93, and a relay emergency valve 94 which may be constructed in accordance with the principles set forth in the patent to Stephen Johnson, Jr., No. 2,018,212, dated October 22, 1935. This valve is provided with a relay portion 95 having a control conduit 96 connected with the control conduit 88 and a supply conduit 97 connected with the trailer reservoir 92. An emergency valve portion 98 is provided with an outlet conduit 99 connected with the actuator 93, and a feed conduit 100 connected with the feed or supply line 89 leading from the tractor to the trailer. The relay valve portion is also provided with an exhaust port, not shown, the construction being such that fluid pressure is normally supplied to the trailer reservoir 92 from the conduit 89 through the conduit 100, the emergency valve portion 98, the relay valve portion 95, and the conduit 97. The construction of the emergency valve portion is such that in the event of sudden drop of pressure in conduits 100 and 89, the emergency valve portion is effective to establish communication between conduits 97 and 99 to supply fluid pressure from the trailer reservoir to the actuator at reservoir pressure, and is also effective to prevent the reverse flow of fluid pressure from the reservoir through the relay emergency valve into the broken conduit 89. The relay valve portion is so constituted as to normally connect conduit 99 with atmosphere, and to prevent communication between conduits 97 and 99, the application of a predetermined pressure to the relay valve through the conduit 96 serving to operate the latter to supply fluid from the reservoir 92 to the conduit 99 and the actuator 93 at a pressure substantially equal to that obtaining in a conduit 96. Since the control conduit 88 is connected to the control conduit on the tractor, and the conduit 89 is connected to the tractor conduit leading to the supply reservoir 14 on the tractor, the trailer reservoir 92 is at all times charged with fluid pressure from the tractor, and an increase in pressure in the control conduit 88 results in corresponding operation of the relay valve portion or fluid pressure operated device 95 of the emergency valve to supply a substantially corresponding pressure to the actuator 93.

Here again the speed of operation in supplying fluid pressure from the reservoir to the trailer actuator is somewhat impaired by the length of the control conduit between the tractor and trailer, and to this end a duplex electromagnet valve 101, preferably identical with the valve 21 on the tractor, is suitably mounted on the trailer adjacent the relay emergency valve 94. This valve is provided with a supply conduit 102, and outlet conduit 103, an exhaust conduit 104, and a conduit 105 which serves to connect the outlet conduit 103 with the exhaust portion of the electromagnet valve. It will be understood, therefore, that with the magnet valve 101 deenergized, the latter serves to prevent communication between conduits 102 and 103, as well as between conduits 105 and 104. When the left hand portion of the valve is energized, conduits 102 and 103 are connected, and when the right hand portion of the valve is energized, conduits 105 and 104 are connected. The left hand portion of the valve is provided with magnet coil terminals 106 and 107, the right hand portion being provided with terminals 108 and 109. The terminals 107 and 108 are interconnected by means of a wire 110, the latter wire being connected to the wire 74 on the tractor by means of a wire 111. In like manner, the terminal 109 is connected with the wire 83 on the tractor by means of a wire 112, and the terminal 106 is connected with the wire 78 on the tractor by means of a wire 113. Thus the application and release portions of the valve 101 are connected in parallel with the corresponding portions of the tractor electromagnet valve 21, and on operation of the switch 56 to energize the portion 22 of the magnet valve 21, the left hand portion of the trailer magnet valve 101 is likewise energized to connect conduits 102 and 103 in order to supply fluid pressure to the latter conduit and to the conduit 96 to operate the relay valve to supply fluid pressure from the trailer reservoir 92 to the trailer brake actuator 93. On operation of the switch 55 to energize portion 23 of the tractor magnet valve, the right hand portion of the magnet valve 101 is likewise energized to connect conduits 105 and 104 in order to exhaust fluid pressure from conduit 103 and conduit 96 leading to the relay valve, the result being that the relay valve is effective to correspondingly release pressure from the actuator 93.

Since the trailer magnet valve 101 preferably has a relatively large fluid pressure flow capacity, and operates substantially instantaneously in response to operation of the application switch 56 on the tractor, it will be apparent that such operation of the magnet valve during application of the brakes may result in a rapid drop in pressure in the supply conduit 102 unless means are provided for rapidly supplying fluid pressure from the source to that conduit. Thus in the event conduit 102 were directly connected with the trailer supply conduit 89, it will be apparent that operation of the magnet valve during a brake application might effect a sufficient reduction in pressure in the conduit 89 to initiate operation of the emergency portion 98 of the relay emergency valve to effect an emergency application of the trailer brake. This action is undesirable, and in order to minimize the drop in pressure in the line 89 during operation of the magnet valve, a relatively small auxiliary reservoir 114 is connected at one end to conduit 102, and is connected at the other end with the conduit 89 by means of a conduit 115 and a one-way check valve 116 as shown, the check valve being so arranged as to permit the flow of fluid pressure from the conduit 89 to the conduit 115, and to prevent flow in the opposite direction. The capacity of the reservoir 114 is so chosen as to prevent a drop in pressure in the conduits 115 and 89 sufficient to operate the emergency valve when the magnet valve is operated to supply fluid pressure to the brake system. As an additional safe guard, a restricted portion 117 is provided in the conduit 115 which serves to limit the rate of flow of fluid pressure to the auxiliary reservoir 114. The size of the restriction 117 can be so chosen as to eliminate an unwanted emergency application of the brakes on operation of the magnet valve, but in the event such a restriction is incorporated in the conduit 115, the reservoir 114 becomes necessary in order to provide sufficient fluid pressure supply to the magnet valve for each individual brake application. In the event of a rupture in the conduit 89 at the left of its junction with the conduit 100, the emergency portion 93 normally operates to effect an emergency application of the trailer brakes. With the capacity of the auxiliary reservoir 114 connected to the conduit 89, however, it will be apparent that unless the check valve 116 is provided, fluid pressure will flow from the reservoir 114 through the conduit 115 to the conduit 89, and the amount of this flow due to the capacity of the reservoir may be sufficient to prevent operation of the emergency portion 93 to effect a desired emergency application of the trailer brake, as the flow of this additional fluid into the conduit 89 will cause the pressure in that conduit to drop at a much slower rate than would normally occur in the event of breakage of the conduit. Thus the reservoir 114, the restriction 117 and the one-way check valve 116 are all effective to prevent interference with the normal functions of the emergency portion of the relay emergency valve due to the incorporation of the magnet valve in the system, and at the same time, the arrangement shown insures an adequate supply of fluid pressure to the inlet conduit or supply conduit 102 of the magnet valve to insure satisfactory operation of the magnet valve in controlling the operation of the brakes.

In view of the foregoing description, it will be readily apparent to those skilled in the art that a relatively simple and efficient electromagnet control has been provided for a tractor, or a tractor-trailer brake system, so constituted as to be readily applied to existing systems without materially interfering with the normal functions of the original system. In the event of failure in the electrical portion of the system, the controller is effective to by-pass fluid pressure from the left hand portion of the conduit 18 into the right hand portion of the conduit and into the trailer control conduit 88, this fluid pressure being transmitted to the tractor and trailer relay valve portions 10 and 95 respectively, in order to operate the latter to supply fluid pressure to the corresponding brake actuators from the reservoirs 14 and 92. When the electrical portion of the system is operative, the initial application of fluid pressure to the chamber in the left end of the controller by operation of the brake valve, effects operation of the switch 56 to instantly energize the application portions of the magnet valves 21 and 101 in order to supply fluid pressure to the right hand portion of conduit 18 and to conduit 88 until such time as pressure therein substantially equals that in the left hand portion of the conduit 18, at which time the application portions of the magnet valves are de-energized, and the system is in lapped position, the same type of operation taking place on release operation of the brake valve. In addition to the foregoing, means have been provided on the trailer for supplying fluid pressure to the trailer magnet valve, so constituted as to permit operation of this valve without interference with the normal functioning of the emergency portion of the trailer relay emergency valve. The controller is also adapted to readily operate switches of the so-called snap action type, thus eliminating many difficulties due to arcing and burning of the switch contacts which have caused difficulty in some of the previous systems of this general type. Also, while the magnet valves in the above systems have been shown as adapted to supply fluid pressure to fluid pressure operated devices such as the relay valves illustrated, and it will be understood that in the event the relay valves are dispensed with, the magnet valve outlet lines 25 and 103 can readily be connected to supply fluid pressure directly to the tractor and trailer brake actuators 8 and 93 respectively.

Although the invention has been illustrated and described herein with considerable particularity, it is to be understood that the same is not limited to the form shown, but may receive a variety of mechanical expressions, as will now readily appear to those skilled in the art. Reference will, therefore, be had to the appended claims for a definition of the limits of the invention.

What is claimed is:

1. In a fluid pressure brake control system of the type having a source of fluid pressure, a fluid pressure actuated braking device, means including power operated valve means for controlling the flow of fluid pressure from the source to the device and for controlling the release of fluid pressure from the device, a connection for supplying fluid pressure to said device, and a control valve for supplying fluid pressure to said connection, and for releasing fluid pressure from said connection, the improvement which comprises a controller interposed between said control valve and connection having a pressure responsive member responsive jointly to the pressure supplied by the control valve and the pressure in the connection normally positioned to prevent communication between the control valve and said connection and movable in either direction in response to variations in pressure in the control valve and in said connection to establish communication between the control valve and said connection, means for selectively energizing said power operated valve means to supply fluid pressure from the source to the device and to release fluid pressure from the device, and an operative connection between said member and energizing means operable on initial movement of the member in one of said directions to render the energizing means effective to energize the power operated valve means to supply fluid pressure to said device and operable on initial movement of said member in the other of said directions to render the energizing means effective to energize the power operated valve means to release fluid pressure from the device.

2. In a fluid pressure brake control system of the type having a source of fluid pressure, a fluid pressure operated braking device, means including an electromagnet valve for supplying fluid pressure from the source to the device, a connection for supplying fluid pressure to said device, and a control valve for supplying fluid pressure to said connection, the improvement which comprises a controller interposed between said control valve and connection and having a pair of chambers, one chamber being connected with the control valve and the other chamber being connected with said connection, a pressure responsive member movably mounted in said controller subjected to the pressures in both chambers, said member being normally positioned to prevent communication between the chambers and being movable in response to an increase in pressure in said one chamber to establish communication between said chambers, means including a switch for energizing said electromagnet valve to supply fluid pressure to the device, and an operative connection between said member and switch operable on initial movement of said member to close said switch and energize said electromagnet valve.

3. In a fluid pressure brake control system of the type having a source of fluid pressure, a fluid pressure operated braking device, means including an electromagnet valve for supplying fluid pressure from the source to the device, a connection for supplying fluid pressure to said device, and a control valve for supplying fluid pressure to said connection, the improvement which comprises a controller interposed between said control valve and connection and having a pair of chambers, one chamber being connected with the control valve and the other chamber being connected with said connection, a pressure responsive member movably mounted in said controller subjected to the pressures in both chambers, said member being effective in one position to prevent communication between said chambers and movable to another position in response to an increase in pressure in said one chamber to establish communication between said chambers, means including a switch for energizing said electromagnet valve to supply fluid pressure to the device, an operative connection between said member and switch operable to close the latter to energize the electromagnet valve on movement of the member from said one position toward said another position, and means for maintaining the member in said one position except when the pressure in said one chamber exceeds the pressure in the other of said chambers by a predetermined value.

4. In a fluid pressure brake control system of the type having a source of fluid pressure, a fluid pressure operated braking device, means including an electromagnet valve for supplying fluid pressure from the source to the device and a second electromagnet valve for releasing fluid pressure from the device, a connection for supplying fluid pressure to the device, and a control valve for supplying fluid pressure to said connection and for releasing fluid pressure from said connection, the improvement which comprises a controller having a pair of chambers, one chamber being connected to the control valve and the other being connected to said connection, a pressure responsive member movably mounted in said controller subjected jointly to the pressures in both chambers, said member being effective in one position to prevent communication between said chambers and operable on movement in either direction from said position to establish communication between said chambers, means for energizing said valves including a switch for the supply electromagnet valve and a switch for the release electromagnet valve and an operative connection between said member and switches operable on movement of the member in one direction from said one position to close one of the switches to energize the supply electromagnet valve and operable on movement of the member in the other direction from said one position to close the other of said switches to energize the release electromagnet valve.

5. In a fluid pressure brake control system of the type having a source of fluid pressure, a fluid pressure operated braking device, means including an electromagnet valve for supplying fluid pressure from the source to the device and a second electromagnet valve for releasing fluid pressure from the device, a connection for supplying fluid pressure to the device, and a control valve for supplying fluid pressure to said connection and for releasing fluid pressure from said connection, the improvement which comprises a controller having a pair of chambers, one chamber being connected to the control valve and the other chamber being connected to said connection, a pressure responsive member movably mounted in said controller subjected jointly to the pressures in both chambers, said member being effective in one position to prevent communication between said chambers and operable on movement in either direction from said one position to establish communication between said chambers, resilient means for normally maintaining the member in said one position, means for energizing said valves including a switch for the supply electromagnet valve and a switch for the release electromagnet valve, and an operative connection between the member and switches operable on movement of the member in one of said directions from said one position to close one of the switches to energize the supply electromagnet valve and operable on movement of the member in the other of said directions from said one position to close the other of said switches to energize the release electromagnet valve.

6. In a fluid pressure brake control system of the type having a source of fluid pressure, a fluid pressure operated braking device, means including an electromagnet valve for supplying fluid pressure from the source to the device and a second electromagnet valve for releasing fluid pressure from the device, a connection for supplying fluid pressure to the device, and a control valve for supplying fluid pressure to said connection and for releasing fluid pressure from said connection, the improvement which comprises a casing having a pair of chambers, one chamber being connected to the control valve and the other chamber being connected with said connection, means for energizing said valve including a switch for the supply electromagnet valve and a switch for the release electromagnet valve, and means operable when the pressure in the first named chamber exceeds the pressure in the second named chamber by a predetermined value for operating one of the switches to energize the supply electromagnet valve and operable when the pressure in the second named chamber exceeds the pressure in the first named chamber by a predetermined value for operating the other switch to energize the release electromagnet valve including a movable pressure responsive member subjected to the pressures in both chambers and an operative connection between said member and switches, said member being operable to prevent communication between the chambers when the pressures therein are substantially equal and movable to establish communication between said chambers when the difference in the pressures in said chambers exceeds said predetermined value.

7. In a fluid pressure brake control system of of the type having a source of fluid pressure, a fluid pressure operated braking device, means including an electromagnet valve for supplying fluid pressure from the source to the device, a connection for supplying fluid pressure to said device, and a control valve for supplying fluid pressure to said connection, the improvement which comprises a controller interposed between said control valve and connection having a pair of chambers, one chamber being connected with the control valve and the other chamber being connected with said connection, a pressure responsive member movably mounted in said controller subjected to the pressures in both chambers, said member being normally positioned to prevent communication between the chambers and being movable in response to an increase in pressure in said one chamber to establish communication between said chambers, means including a switch for energizing said electromagnet valve to supply fluid pressure to the device, and means for operating said switch to energize said electromagnet valve during initial movement of said member and for permitting further movement of said member to establish communication between said chambers including a resilient operating connection between said member and switch.

8. In a fluid pressure brake control system of the type having a source of fluid pressure, a fluid pressure operated braking device, means including an electromagnet valve for supplying fluid pressure from the source to the device and a second electromagnet valve for releasing fluid pressure from the device, a connection for supplying fluid pressure to the device, and a control valve for supplying fluid pressure to the connection and for releasing fluid pressure from the connection, the improvement which comprises a pair of snap action switches for connecting a source of electrical energy respectively with the supply electromagnet valve and with the release electromagnet valve, and means for selectively operating said switches and controlling the flow of fluid pressure between said control valve and said connection including a controller having a pair of chambers, one chamber being connected to the control valve and the other chamber being connected to said connection, a pressure responsive member mounted in said controller subjected to the pressures in said chambers, said member being effective in one position to prevent communication between said chambers and being movable in either direction from said position in response to differences of pressure in said chambers to establish communication therebetween, and a resilient operating connection between said member and each of said switches.

9. In a fluid pressure brake control system having a source of fluid pressure, a fluid pressure brake actuator, and a fluid pressure operated relay valve for controlling the supply of fluid pressure from the source to the actuator and for controlling the release of fluid pressure from the actuator, means for controlling the operation of the relay valve including an electromagnet valve for supplying fluid pressure thereto to operate the relay valve to supply fluid pressure from the source to the actuator and a second electromagnet valve for releasing fluid pressure from the relay valve whereby the latter is operable to release fluid pressure from the actuator, a self-lapping control valve having a connection with the source and a connection with the relay valve, the improvement which comprises means for controlling the energization of said magnet valves and the flow of fluid pressure in said last named connection including a controller interposed in said connection having a passage connected at one portion with the operator's control valve and at another portion with the relay valve, a pressure responsive member movably mounted in said passage operable to normally prevent the passage of fluid pressure therethrough and operable on movement through a predetermined distance in response to pressure differentials acting thereon to permit the flow of fluid pressure through said passage, and means for energizing said magnet valves including switch means having an operating connection with said pressure responsive member and actuated by initial movement of the member in one direction to energize the first named magnet valve and by initial movement in the other direction to energize the second magnet valve.

10. In a brake system of the type having a source of fluid pressure, a brake chamber, a relay valve for connecting said source and chamber, electro-magnet valves for controlling said relay valve, and a brake valve having a first connection with said source and a second connection with the relay valve and electro-magnet valves, the improvement which comprises a controller having a casing in series with the second connection, a pair of snap-acting switches mounted outside of said casing for controlling said electro-magnet valves, and a pressure responsive member within the casing mounted to move in opposite directions in response to relatively low pressure differentials to operate said switches while substantially preventing fluid flow through said casing, and movable in response to relatively higher pressure differentials to establish fluid flow through said casing.

ELLERY R. FITCH.

REFERENCES CITED

The following references are of record in the file of this patent:

UNITED STATES PATENTS

| Number | Name | Date |
| --- | --- | --- |
| 2,018,212 | Johnson | Oct. 22, 1935 |
| 2,052,204 | Logan | Aug. 25, 1936 |
| 2,091,046 | Hewitt | Aug. 24, 1937 |
| 2,136,577 | Campbell | Nov. 15, 1938 |
| 2,147,296 | Farmer | Feb. 14, 1939 |
| 2,234,897 | Eaton | Mar. 11, 1941 |
| 2,360,659 | Eaton | Oct. 17, 1944 |